Oct. 19, 1926.
S. MÖHL
1,603,395
GEAR WHEEL PUMP OF ADJUSTABLE CAPACITY
Filed March 31, 1922
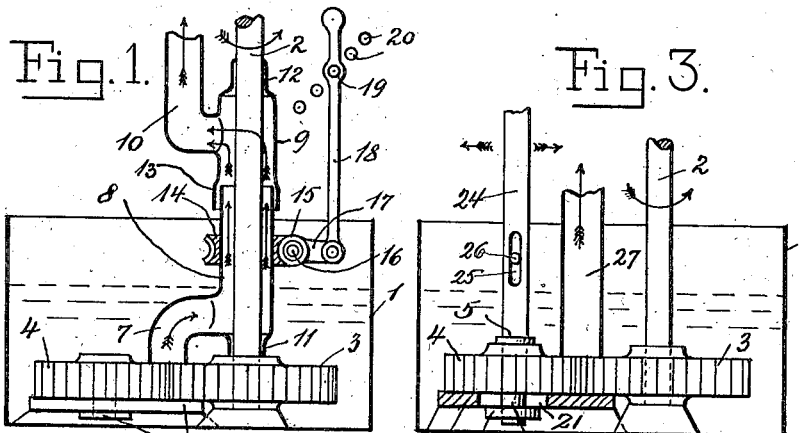
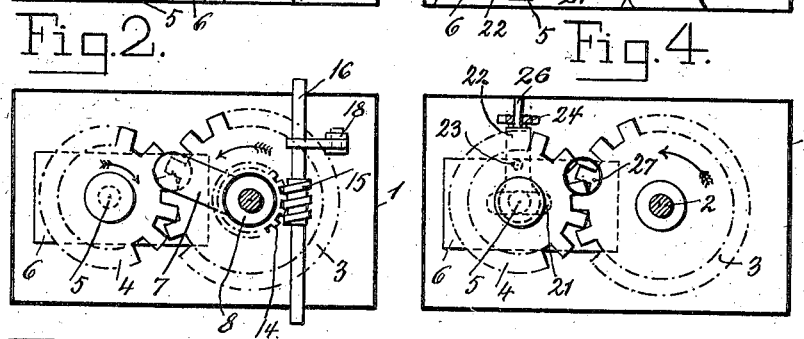
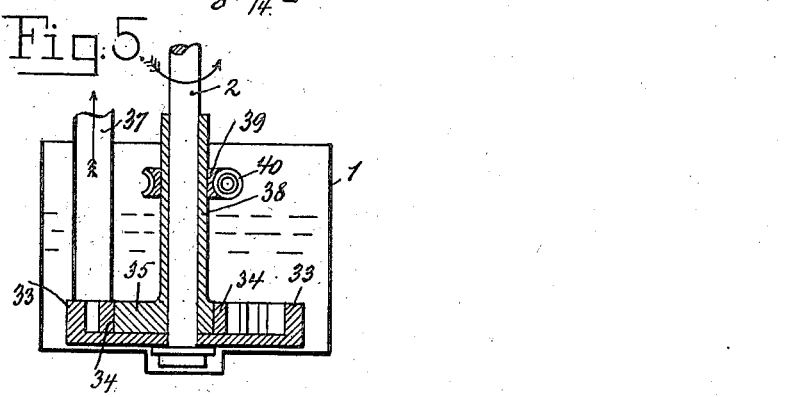
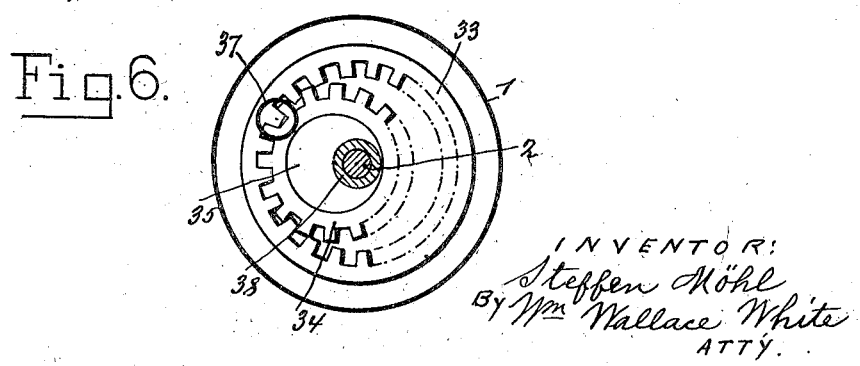
INVENTOR:
Steffen Möhl
By Wm Wallace White
ATTY.

Patented Oct. 19, 1926.

1,603,395

UNITED STATES PATENT OFFICE.

STEFFEN MÖHL, OF COPENHAGEN, DENMARK.

GEAR-WHEEL PUMP OF ADJUSTABLE CAPACITY.

Application filed March 31, 1922, Serial No. 548,552, and in Denmark April 9, 1921.

The present invention relates to a gear-wheel pump characterized, in comparison with the heretofore known pumps of this kind, by the feature that the capacity of the pump (i. e. the quantity of fluid per revolution) is adjustable.

The gear-wheel pump which forms the object of the present invention consists essentially of two mutually engaging gear wheels of the same width and with plane side faces, one of the said gear wheels being driven by power from the outside and driving the other wheel, and of a pipe (the delivery pipe), the plane end face of which, in combination with a plane disc disposed opposite to the said end face and on the other side of the wheel, fits fluid-tightly against the plane side faces of the gear wheels and covers a larger or smaller portion of the field of engagement of the gear wheels in front of the centre line. The gear wheels work fully immersed in the liquid to be pumped, and the pumping action is caused by the quantity of liquid filling each of the tooth spaces, gradually as the teeth move forward into engagement with the teeth of the other wheel, being cut out from connection with the remaining quantity of fluid and therefore, during further rotation of the gear wheels, becoming forced sideways out from the tooth spaces and into the pipe, as far as the quantity of liquid displaced during the motion of the tooth spaces past the pipe orifice is concerned. The quantity of fluid forced into the pipe depends not only on the quota of the field of engagement in front of the centre line covered by the pipe orifice but also on the distance of the pipe orifice (the centre of the pipe orifice) from the centre line because, all other conditions being unchanged, the greater the angle between the centre line and the radius to the centre of the tube orifice is made, the greater will be the quantity of fluid forced out into the pipe during the motion of the tooth spaces past the pipe orifice.

The pipe orifice, however, should always be entirely inside of the point at which the engagement of the teeth commences.

All that is needed in order that the capacity of the pump may be varied by this construction is the provision of suitable means for altering the angle between the radius through the centre of the tube orifice and the centre line, as will be further explained below.

If involute toothing is used, some adjustment of the capacity may also be effected by altering, by means of suitable devices, the distance centre to centre of the gear wheels.

The distinguishing feature of the invention is thus that, while by the heretofore known gear-wheel pumps the pressure zone comprises the entire portion of the field of engagement in front of the centre line, the pressure zone of the pump according to the present invention comprises only a smaller portion of this field viz., the portion covered by the orifice of the delivery pipe, and that the conditions determining the capacity of the pump in the thus limited pressure zone may be altered in order thereby to adjust the capacity of the pump.

The invention is illustrated on the drawing showing various constructions.

Figs. 1 and 2 show a construction of a gear-wheel pump with adjustable delivery pipe, in partly sectional side elevation and in top-view, respectively, Figs. 3 and 4 a construction of a gear-wheel pump with fixed delivery pipe and with devices for varying the distance between the shafts of the two gear wheels, similarly in partly sectional side elevation and in top-view, Figs. 5 and 6 a construction of a gear-wheel pump with fixed delivery pipe and with devices serving to turn the axis of one of the gear wheels along the cylinder surface about the axis of the other gear-wheel, in vertical section along the centre line of the wheels and in top-view, respectively.

For the sake of clearness all of the figures are diagrammatical.

Each pump is shown to be placed in a vessel 1 in which the fluid to be conveyed by means of the pump is contained.

In Figs. 1 and 2, 2 is the driving shaft and 3 the gear wheel fixed on the same, while 4 is the gear wheel engaging gear wheel 3 and being mounted rotatably on its shaft 5. 6 is the plate limiting the field of engagement to one side (downward), and 7, 8, 9, 10 the delivery pipe. The latter consists of a stationary portion 9, 10 and a rotatable portion 7, 8. The top piece 8 of the rotatable portion and the bottom piece 9 of the stationary portion form in combination a fluid-tight casing about a portion of the shaft 2, the piece 8 being journalled about the shaft by means of a collar 11, while the piece 9 is fitted with a collar 12 forming the bearing of the shaft, and the bottom end of the piece 9 is fitted with a sleeve 13 acting as bearing for the top end of the piece 8. From the latter projects the branch pipe 7 which ends on top of the field of engagement and fits tightly against the side faces of the gear wheels, while the delivery pipe proper 10 branches off from the piece 9. The piece 8 supports a worm wheel 14 which is engaged by a worm 15 attached to a shaft 16. This shaft supports an arm 17 which is hinged to the bottom end of a bar 18 the top end of which is fitted with an eye 19 adapted to be hooked onto any one of a series of pins 20 provided, at various levels, for instance on the wall of the vessel. When the arm 17 is lifted or lowered, the tube 8 will be turned about the shaft 2 and, thereby, the tube 7 is approached to or removed from the centre line for the two gear wheels 3, 4 whereby a variation of the capacity of the pump will be effected.

In the construction shown in Figs. 3 and 4 the shaft 5 of the gear wheel 4 passes through a slot 21 in the plate 6 disposed below the field of engagement. 22 is a bar connected to the shaft 5 and pivoted about a fixed pin 23, the end of the bar farthest away from the shaft being pivotally connected to a lever 24 engaging, by means of a slot 25, a pin 26 in such a manner that, when the lever is moved to one or the other side, the bar 22 will be turned about the pin 23 and will thereby move the shaft 5 with the gear wheel 4 away from or nearer to the gear wheel 3. The delivery pipe 27 is fixed above the field of engagement in front of the centre line of the wheels and has its end face in close contact with the side faces of the wheels. The capacity of the pump is varied, as described above, by altering the distance between the wheel shafts.

Instead of a stationary delivery pipe 27 there may be used a swinging delivery pipe 7, 8, 9, 10 as shown in Figs. 1 and 2, and in that case the capacity of the pump may be adjusted by variation of the distance centre to centre of the gear wheel shafts as well as by rotation of the delivery pipe along field of engagement.

In the construction shown in Figs. 5 and 6 the two gear wheels are placed inside of one another, the gear wheel fixed on the shaft 2 being here an internally toothed rim 33 engaging an externally toothed rim 34 adapted to rotate about an eccentric disc 35 which is journaled on the shaft 2. When this disc is rotated, the axis of the toothed rim will be revolved relatively to the stationary delivery pipe 37, the axis of revolution of one of the toothed rims being thus moved along a cylinder surface about the axis of revolution of the other toothed rim, and the capacity of the pump is thereby altered. The eccentric disc 35 may suitably be rigidly connected to a tube 38 encircling the shaft 2 and being adapted to be turned by means of a worm gear 39, 40 in similar manner as the pipe 8 in Figs. 1 and 2.

By all of the constructions, the fixed plate 6 may be replaced by a delivery pipe corresponding entirely to the delivery pipe otherwise described for the construction concerned. The two pipes may either be extended each to its separate point of discharge, or they may be joined together, outside of the gear wheels, so as to form one single delivery pipe.

The number of teeth should be large, and the pipe orifice should cover a large number of teeth.

For the sake of clearness the proper proportion is not shown on the drawing.

If pressure fluid is forced through the described pumping devices in a direction opposite of the one shown by an arrow on the various delivery pipes, then the pumps will be acting as motors, and the shaft 2 formerly driving the pump will now be driven by the pressure fluid concerned, but in opposite direction. The statements here made concerning gear-wheel pumps will therefore also hold good in case of pressure fluid gear-wheel motors.

Supposing the pipe orifice to be adjusted in such a manner that the centre line bisects the orifice, then the total pumping effect will become zero. For the passage of each individual tooth, however, there will be produced both a pumping and a sucking effect depending as to size and sequence on the shape of tooth but always counter-balancing one another. If the further supposition is made that the delivery pipe is closed and filled with fluid, alternating pressures will be created within the delivery pipe, the pressure varying, during the pressure of each tooth, according to a law determined by the shape of tooth. During the conditions supposed the device will be adapted to act as a generator of pressure pulsations, and the latter may be utilized to drive stone drilling apparatus, riveting tools and the like by insertion of a working piston in the delivery pipe, or as motive power in a motor of construction suited for the purpose, for instance of the same construction as the pulsation generator, so that the device constructed in this manner will constitute a complete "wave power transmitter".

Having now particularly described and ascertained the nature of my said invention and in what manner the same is to be performed, I declare that what I claim is:—

A gear wheel pump of adjustable capacity, comprising a driving shaft, two mutually engaging gear wheels immersed in a liquid container, one of said gear wheels being freely rotatable about its axis, the second gear wheel being fixedly disposed on said driving shaft, the field of engagement of the gear wheels on one side being fluid-tightly closed, a delivery pipe disposed at the opposite side of said field of engagement, the end face of said pipe covering a portion of said field of engagement, said delivery pipe being adapted for adjustment in relation to the field of engagement, and means for varying the position of the delivery pipe in relation to said field of engagement.

In testimony whereof I have signed my name to this specification.

STEFFEN MÖHL.